(12) United States Patent
Tanaka et al.

(10) Patent No.: US 6,332,203 B1
(45) Date of Patent: *Dec. 18, 2001

(54) TESTING APPARATUS AND METHOD FOR PREVENTING A DISK UNIT FROM BEING DAMAGED

(75) Inventors: Hitoshi Tanaka; Masao Kobori; Ikuko Tachibana, all of Kawasaki (JP)

(73) Assignee: Fujitsu Limited, Kawasaki (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/971,920

(22) Filed: Nov. 18, 1997

(30) Foreign Application Priority Data

Apr. 28, 1997 (JP) .................................................. 9-110593

(51) Int. Cl.⁷ ...................................................... G06F 11/00
(52) U.S. Cl. ................................................................ 714/42
(58) Field of Search ................................ 360/75, 31, 104, 360/105, 109; 702/186; 714/42, 5, 6, 7, 8; 713/300, 320, 340

(56) References Cited

U.S. PATENT DOCUMENTS

| | | | |
|---|---|---|---|
| 3,681,682 | * | 8/1972 | Cox et al. .................. 360/31 |
| 4,725,968 | * | 2/1988 | Baldwin et al. ................ 702/186 |
| 4,903,157 | * | 2/1990 | Malek .................. 360/75 |
| 4,985,793 | * | 1/1991 | Anderson .................. 360/105 |
| 5,241,438 | * | 8/1993 | Matsushima .................. 360/75 |
| 5,345,347 | * | 9/1994 | Hopkins et al. .................. 360/75 |
| 5,367,420 | * | 11/1994 | Yagi et al. .................. 360/104 |
| 5,452,159 | * | 9/1995 | Stefansky .................. 360/105 |
| 5,541,790 | * | 7/1996 | Bleeke .................. 360/105 |
| 5,615,335 | * | 3/1997 | Onffroy et al. .................. 714/42 |
| 5,644,705 | * | 7/1997 | Stanley .................. 714/42 |
| 5,703,735 | * | 12/1997 | Bleeke .................. 360/105 |
| 5,835,298 | * | 11/1998 | Edgerton et al. .................. 360/75 |
| 5,895,438 | * | 4/1999 | Yomtoubian .................. 714/42 |

FOREIGN PATENT DOCUMENTS

| | | |
|---|---|---|
| 1-171172 | 7/1989 | (JP) . |
| 4-271072 | 9/1992 | (JP) . |

* cited by examiner

Primary Examiner—James P. Trammell
Assistant Examiner—Pierre E. Elisca
(74) Attorney, Agent, or Firm—Staas & Halsey LLP

(57) ABSTRACT

By means of a power-saving function in the information processing device to be tested, the motor in the HDD (Hard Disk Drive) is stopped by the testing program, when the information processing device is transported. Thus, the read/write head in the HDD is automatically set to a safe position.

22 Claims, 13 Drawing Sheets

TESTING APPARATUS AND METHOD FOR PREVENTING A DISK UNIT FROM BEING DAMAGED

BACKGROUND OF THE INVENTION

1. Field of the Invention

The present invention relates to an apparatus and a method for testing an information processing device such as a work station or a personal computer (abbreviated to PC hereafter), used in combination with a memory unit using a disk-type medium (described as a disk unit hereafter).

2. Description of the Related Art

As the typical disk unit used in the information processing device (computer), a hard disk drive (abbreviated to HDD hereafter) is well known. FIG. 1A shows an arrangement of a magnetic disk and a read/write head which is a storage medium of the HDD internally installed in the PC.

In FIG. 1A, data are stored on an upper magnetic disk 1, and positioning information is stored on a lower magnetic disk 1. Based on the positioning information on the lower magnetic disk, the HDD accesses data on the upper magnetic disk 1.

Recently, the HDD has become smaller in size and denser in assembly, and the head 2 comes very close to the surface of the magnetic disk 1, with a distance equal to or less than 0.1 μm. Owing to vibration or impact, the head 2 may come into contact with the S magnetic disk 1, thereby causing damage to the magnetic disk 1 and the data on the magnetic disk 1.

FIG. 1B shows a plan view of the magnetic disk 1. Normally, when a drive motor of the HDD stops, the head 2 stays at a position in a texture area 4. The texture area 4 is located on the outer side of a data storage area 3 on the magnetic disk 1. So long as the head 2 stays in the texture area 4, the data will not be damaged by vibration and the like. The texture area 4 may also be formed in an inner area 5 of the data recording area 3.

Many of the operation testing processes in the PC during manufacturing are performed in a completed assembly in which the HDD is installed. The testing of the PC is generally executed by a plurality of function testing processes. During these testing processes, since the PCs are tested while they are being put on a pallet and transported on a conveyor or by rollers, vibrations and collisions between pallets frequently occur.

During transportation of the PCs, the data storage area 3 in the magnetic disk 1 can be damaged by contact from the head 2, resulting in damage to data stored in the data storage area 3. In order to prevent the data on the HDD from being damaged, the following countermeasures are conventionally taken:

(1) To avoid vibrations from the rollers during transportation, the rollers should be exactly set horizontally.

(2) To avoid vibrations and collisions between pallets during transportation, the pallets are moved slowly.

(3) Operators are instructed to disconnect the power supply and only to move a pallet after fifteen seconds, when the HDD motor has definitely stopped in the PC.

In the conventional testing processes, however, there are such problems as described below:

(1) In order to set the rollers more precisely in the horizontal direction, expensive equipment is required.

(2) When the pallets are set to move slowly, the total output of products decreases.

(3) When the necessary time for the HDD motor to be stopped is secured, the total number of products decreases because it takes time to transport the products to the subsequent process. Further, the operators do not always wait to ensure the HDD motor has stopped before moving the pallets. They might start moving the pallets before the HDD motor stops, thereby causing damage to the stored data.

SUMMARY OF THE INVENTION

It is an object of the present invention to provide a testing apparatus and method, in which data are prevented from being damaged during transportation of a disk unit such as an HDD, during manufacturing of an information processing device.

A testing apparatus of the present invention is equipped with a testing unit and a processing unit and performs testing of the information processing device including the disk unit. The testing apparatus includes a part or all of the information processing device to be tested.

The testing unit performs an operation testing process on the information processing device, and the processing unit executes a program to set a disk R/W head to a specific position, when the disk unit is out of use.

In the operation testing process of the information processing device in which the disk unit is out of use, such as in the case of transporting the information processing device, the head is fixedly set to the specific position by the program. The specific position means a predetermined position safely assured to be free from causing damage to the disk, and, for example, corresponds to the texture area of the magnetic disk.

The processing unit executes the program described above, and, as one example of performance, transmits to the disk unit a signal designating stopping of the drive motor in the disk unit. Thus, the drive motor is stopped and the head is automatically set to the specific position.

By automatically setting the head to a safe position regardless of the operator's manipulation, the R/W head is prevented from making contact with the data storage area of the disk, even if the information processing device receives a sudden and accidental vibration or shock. Accordingly, the data on the disk are prevented from being damaged during transportation of the device.

DETAILED DESCRIPTION OF THE PREFERRED EMBODIMENT

Figure 1A:
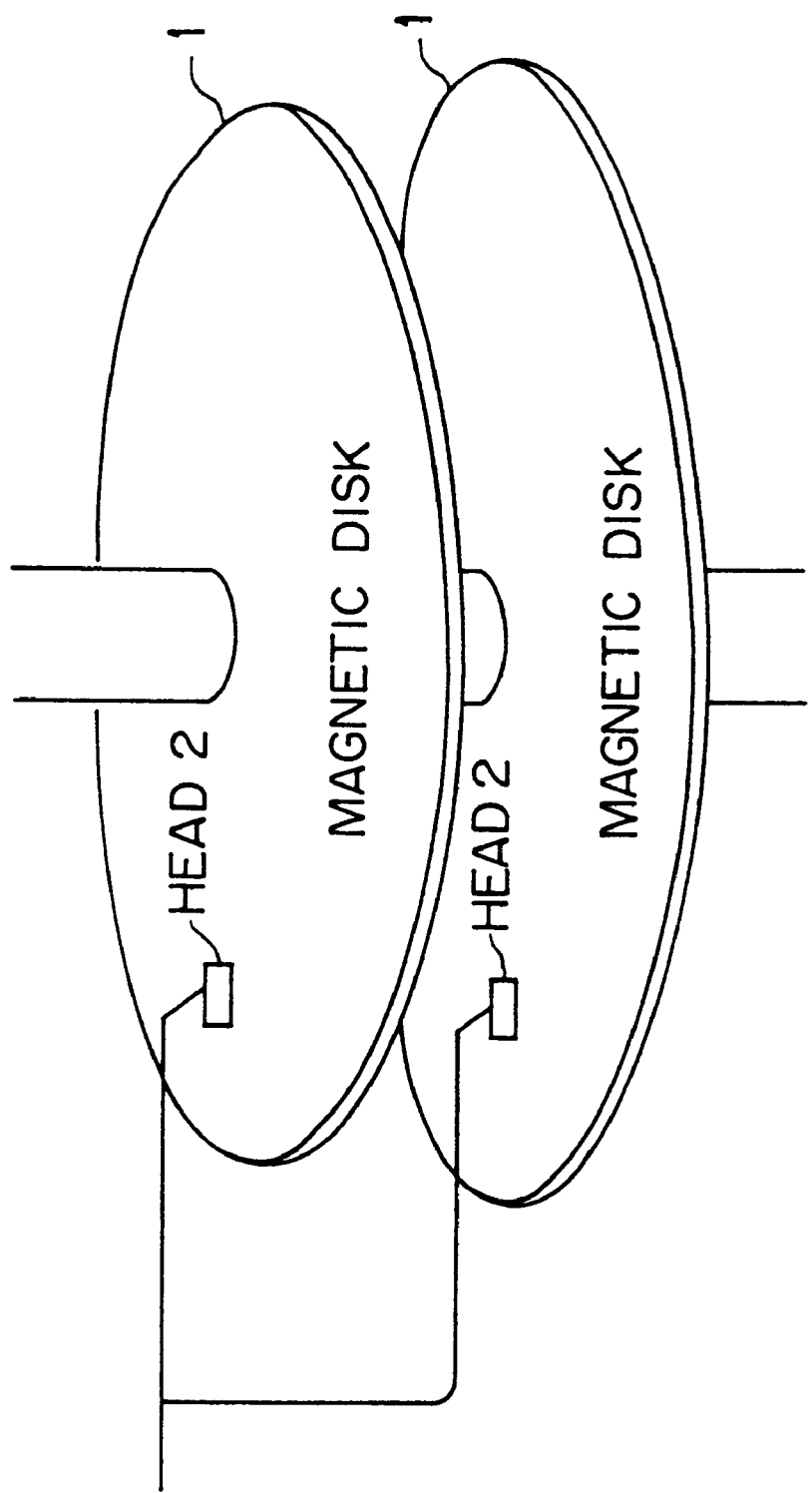
FIG. 1A shows an arrangement of a magnetic disk and an R/W head.
Figure 1B:
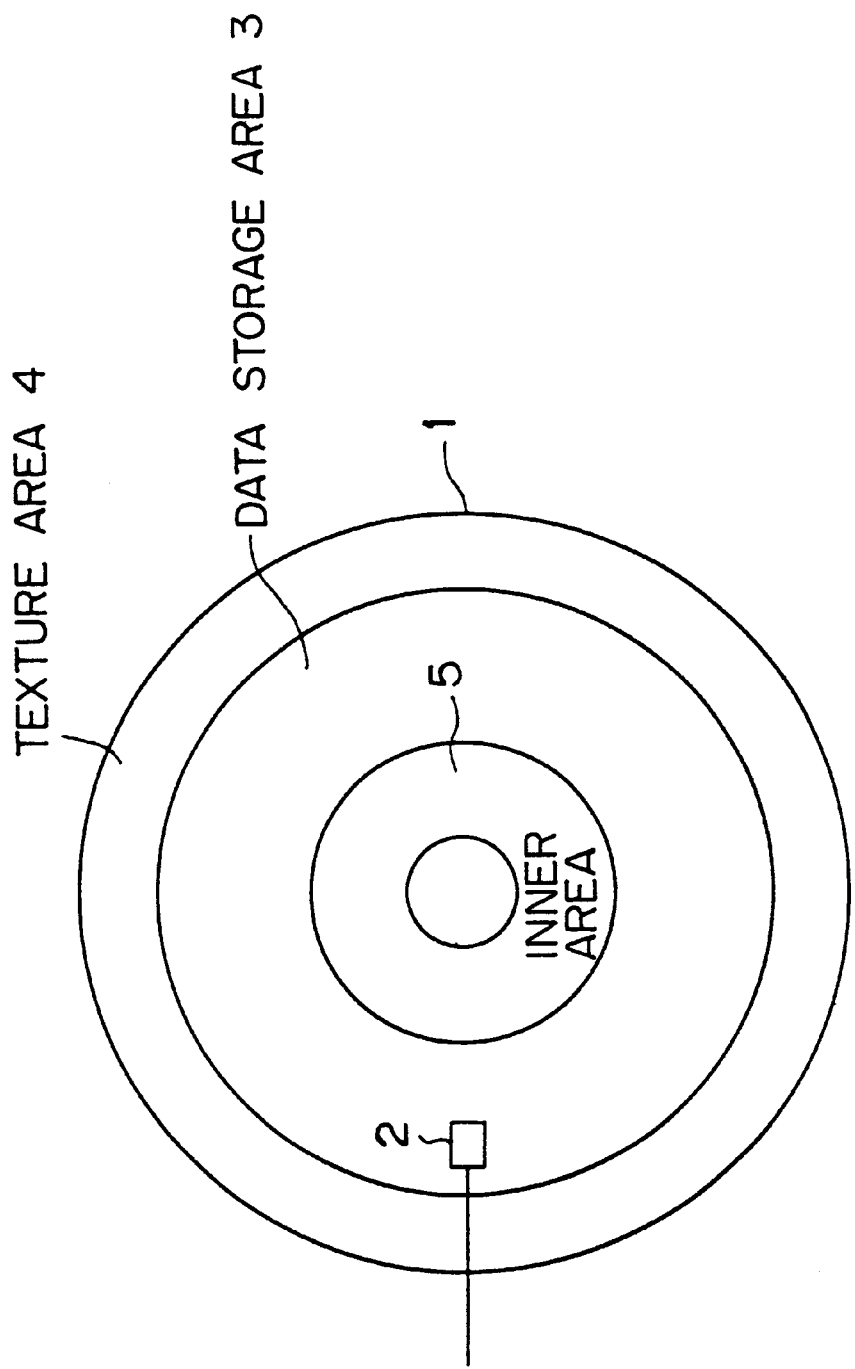
FIG. 1B shows an arrangement of a texture area in the magnetic disk.
Figure 2A:
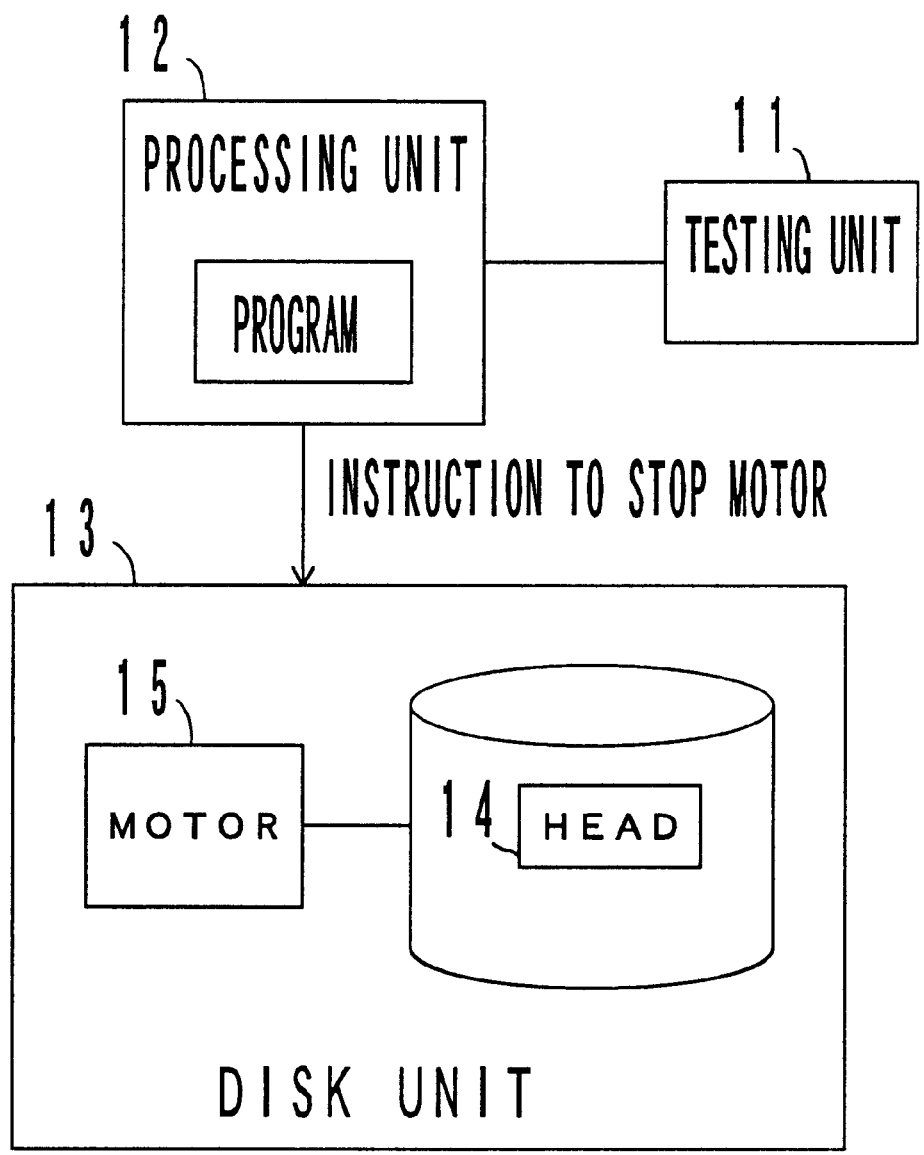
FIG. 2A is a block diagram showing the principle of the present invention.

The detailed description of the preferred embodiment of the present invention will be given in the following with reference to the drawings. FIG. 2A shows the principle of a testing apparatus of the present invention. The testing apparatus in FIG. 2A comprises a testing unit 11 and a processing unit 12, and performs testing of an information processing device including a disk unit 13. The testing apparatus includes a part or all of the information processing device to be tested.

The testing unit 11 performs the operation testing process of the information processing device, and the processing unit 12 executes a program for setting a head 14 in a specific position when the disk unit 13 is not in use. The specific position means a predetermined position safely assured to be free from causing damage to the disk, and, for example, corresponds to the texture area 4 in the magnetic disk described above.

The processing unit 12 executes the program described above, and, as one example of performance, transmits to the disk unit 13 the signal for designating stopping of a motor 15 in the disk unit 13. Thus, the motor 15 is stopped and the head is automatically set to the specific position.

By automatically setting the head 14 to a safe position regardless of the operator's manipulation, the R/W head 14 is prevented from contacting with the data storage area of the disk, even if the disk unit 13 receives a sudden and accidental vibration or shock. Accordingly, the data on the disk are prevented from being damaged during transportation of the disk unit 13 between processes.

Thus, no expensive equipment is required to keep the rollers horizontal, and the information processing device can be rapidly transported, and by suitably programming the timing of stopping the drive motor, the wait time before moving can be eliminated.

For example, as described later in FIG. 2B, both the testing unit 11 and the processing unit 12 correspond to a CPU 21 (Central Processing Unit), a ROM 22 (Read Only Memory), and a RAM 23 (Random Access Memory), and the disk unit 13 corresponds to the HDD 24.

In the present invention, the program brings the drive motor of the HDD to an automatic stopping state, except for the case when operation of the HDD is required, such as for the testing of the HDD itself. In such a manner as described above, the head is positioned in the texture area, thereby preventing the data from being damaged during the manufacturing and testing process.

The power-saving function provided in the PC is available for stopping the motor during the testing process of the PC. When the HDD is out of use, the motor is stopped by forcibly bringing it into a STANDBY state. Thus, the head is fixed over the texture area.

Figure 2B:
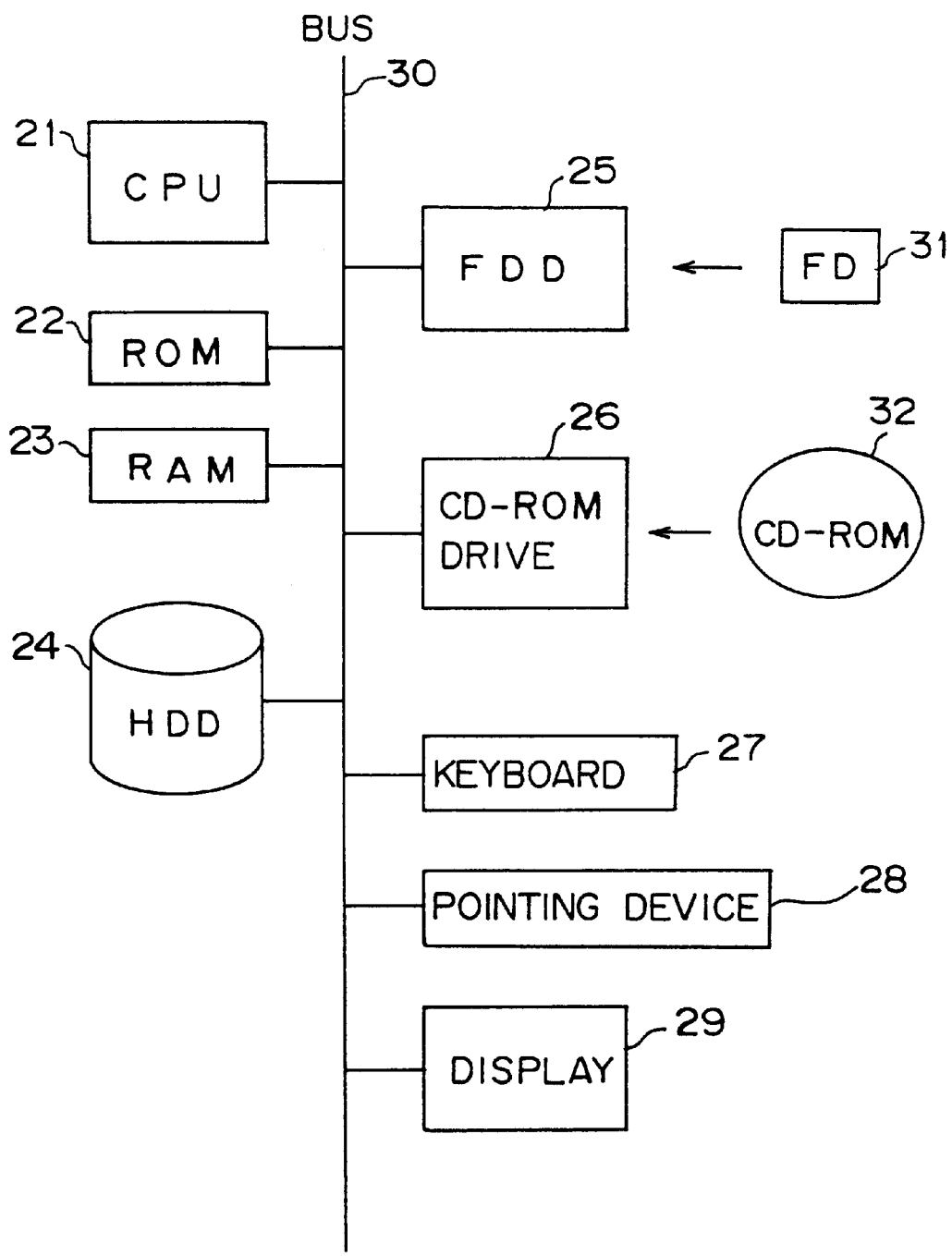
FIG. 2B is a block diagram showing the structure of the information processing device.

FIG. 2B is a block diagram showing the structure of the information processing device such as a PC, which is the object to be put through the testing process. The information processing device in FIG. 2B comprises a CPU 21, a ROM 22, a RAM 23, an HDD 24, an FDD 25 (floppy disk drive), a CD-ROM drive 26 (Compact Disk Read Only Memory), a keyboard 27, a pointing device 28, and a display 29, and these units are connected by a bus 30.

The CPU 21, for example, executes a testing program stored in the ROM 22 or on a floppy disk (FD) 31 by means of the RAM 23. The HDD 24 drives the magnetic disk, the FDD 25 drives the FD 31, and the CD-ROM drive 26 drives the CD-ROM 32.

The testing program can also be written in a CD-ROM 32 and read out to the information processing device. In order to store the testing program, any recording media enabling reading out by a computer can be used, such as memory card, optical disk, magneto-optical disk, and the like, in addition to the FD 31 and the CD-ROM 32.

The keyboard 27 and the pointing device 28 are used for inputting the operator's instructions, and the display 29 displays messages and test results to the operator.

Further, provision of a network connecting unit (not shown in the diagrams), makes it possible for the information processing device to be connected to any communication network such as a LAN (Local Area Network), and to control the testing process from an external information processing device.

The following cases are considered for the timing of stopping the HDD drive motor:

(1) Immediately after the initial program loading (IPL)

(2) Immediately after the testing process using the HDD

Figure 3:
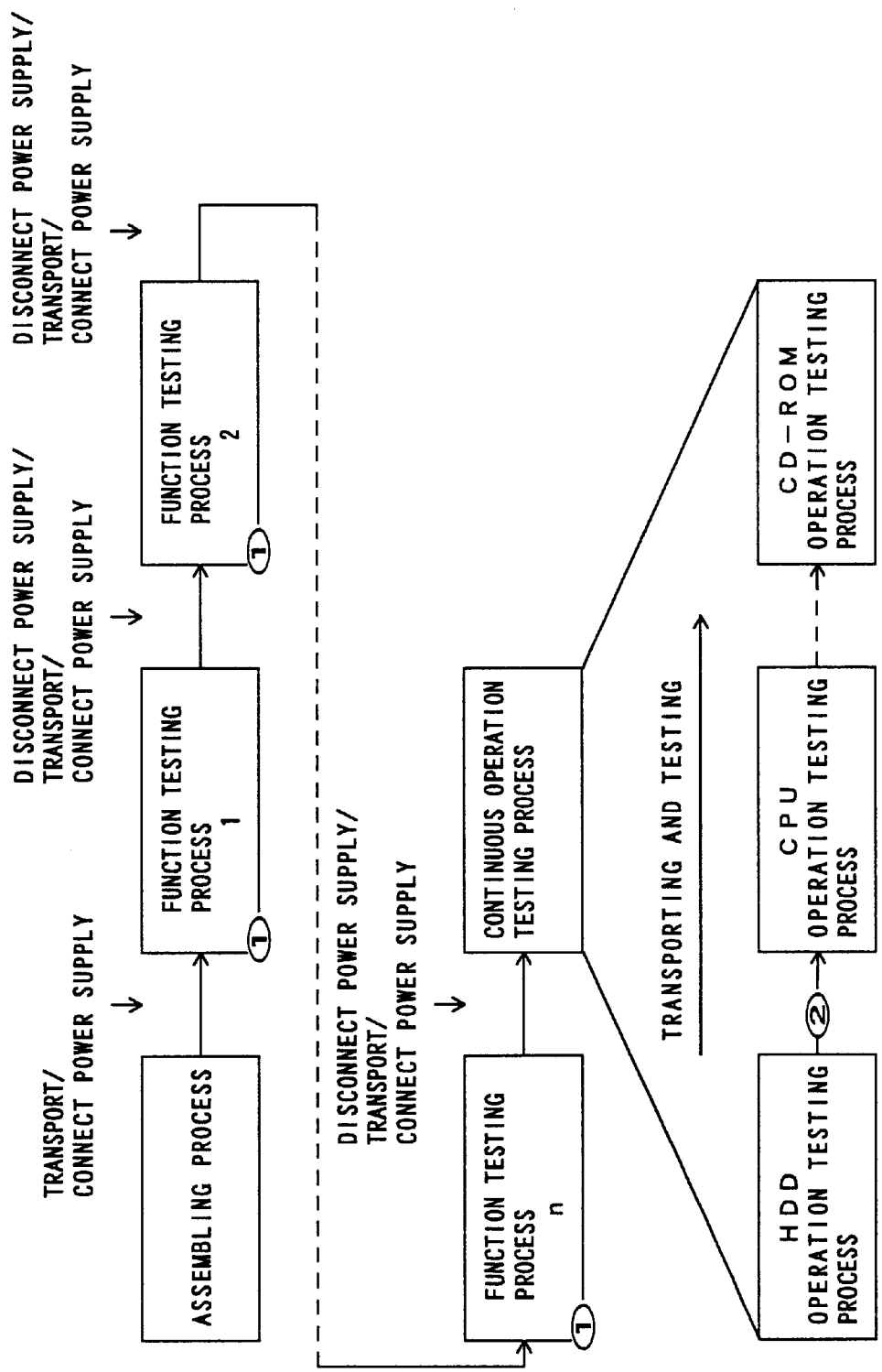
FIG. 3 is a block diagram showing the manufacturing process of the information processing device.

IPL includes a series of operations for initialization of the information processing device, and the testing process using the HDD is, for example, the operation testing process for the HDD. The testing method of the present invention will be explained with reference to the manufacturing process of the PC as follows:

FIG. 3 shows a block diagram of the PC manufacturing line including the testing processes according to the present invention. Generally, the testing processes during manufacturing are divided into n items of function testing processes, 1, 2, 3, . . . n, and a continuous operation testing process. In the continuous operation testing process, a series of operation testing processes are performed on a plurality of units such as an HDD 24, a CPU 21, a CD-ROM drive 26, etc, for a predetermined period of time, while the PC is being moved between each of the operation testing processes.

Figure 4:
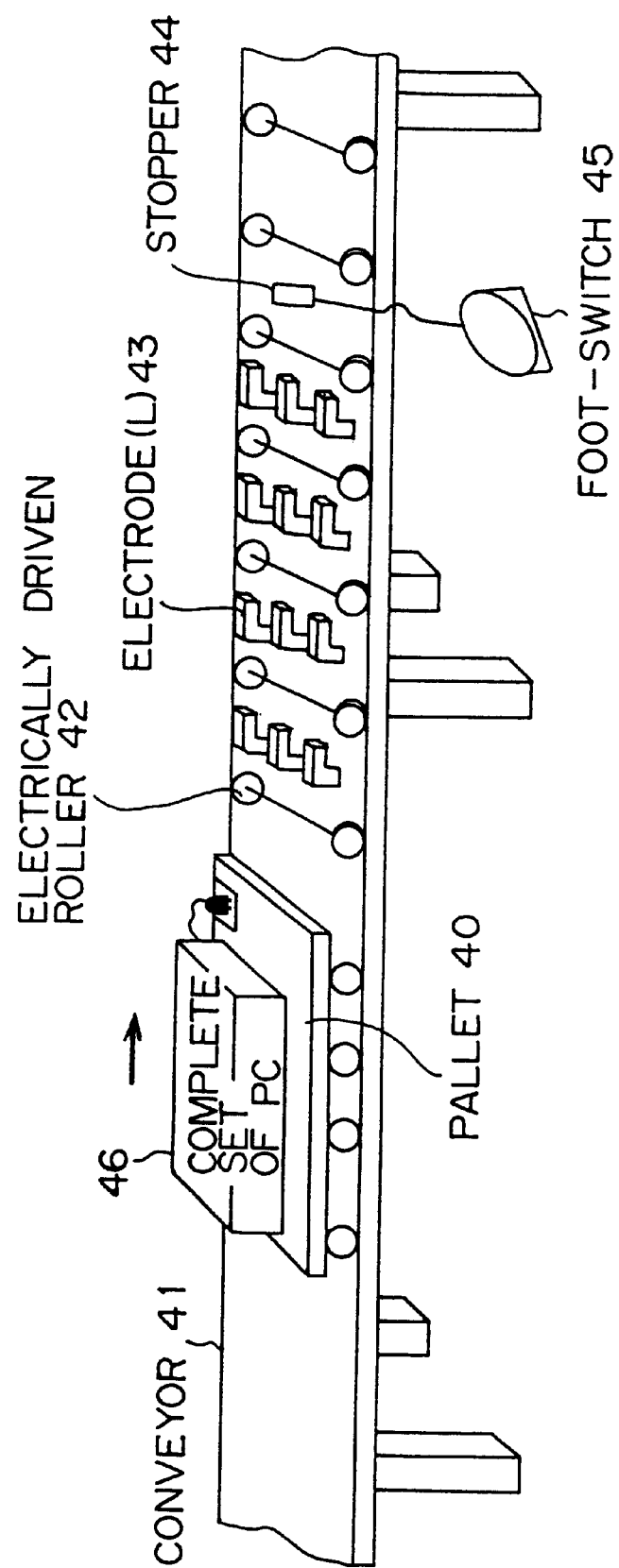
FIG. 4 shows an arrangement of the PC manufacturing line.

FIG. 4 shows the manufacturing line in the PC assembly plant. In FIG. 4, a PC 46 is mounted on a pallet 40, and transported with the pallet 40 over a conveyor 41. Electrically driven rollers 42 are installed on the conveyor 41 to transport the pallet 40, and electrodes (L) 43 are set at predetermined intervals along the direction in which the pallet 40 is transported, for the purpose of supplying the electric power to the PC 46 on the pallet 40, a stopper 44 is provided to stop the pallet 40, and actuating/releasing of the stopper is controlled by a foot-switch 45.

Figure 5:
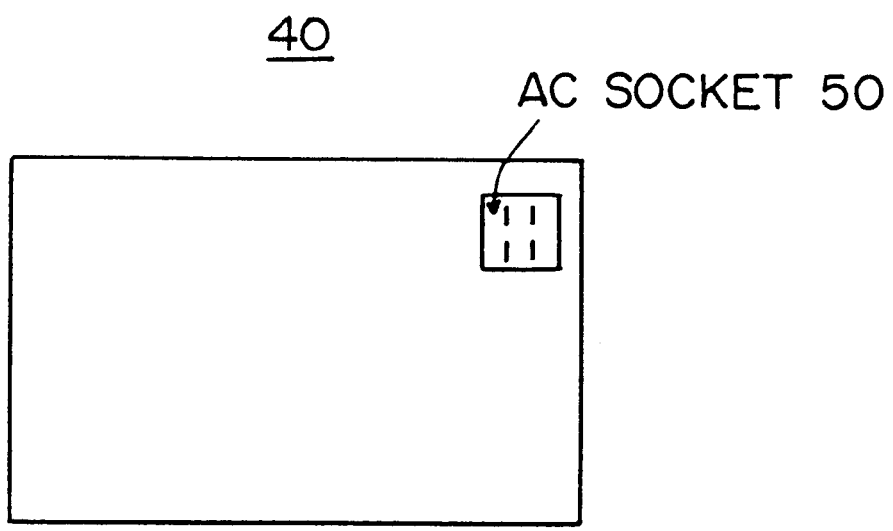
FIG. 5 is a schematic drawing of a pallet surface.
Figure 6:
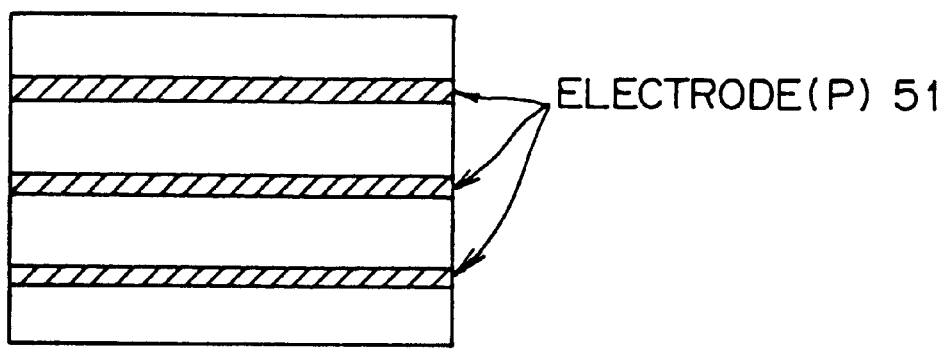
FIG. 6 is a schematic drawing of the underneath of a pallet.

FIG. 5 is a schematic drawing showing the top of the pallet 40. An AC socket 50 is provided so that a plug on a power supply cord of the PC 46 can be connected to it. As shown in FIG. 6, electrodes (P) 51 are provided on the bottom of the pallet 40.

Figure 7:
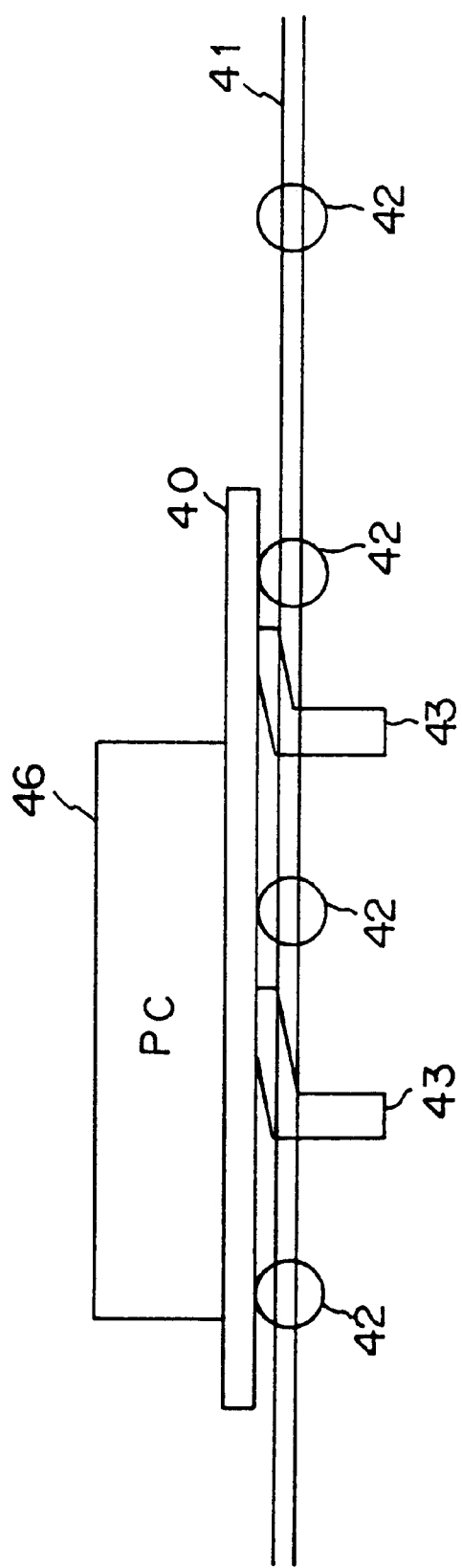
FIG. 7 is a schematic drawing showing a side elevation of the manufacturing line.

As shown in FIG. 7, when the pallet 40 is placed on the conveyor 41, the electrodes 43 on the conveyor 41 are brought in contact with the electrodes 51 on the pallet 40, to supply the electric power to the AC socket 50. The electrodes 43 can continue to supply power to the PC 46 while the pallet 40 is being moved on the conveyor 41, because the electrodes 43 are provided at predetermined intervals along the direction in which the pallet 40 is moving.

In a manufacturing plant, the PC 46 which is mounted on the pallet 40 is loaded onto the conveyor 41, and is moved along the conveyor 41 by the rotation of the electrically driven rollers 42. In some parts of the manufacturing line, the pallet 40 is manually moved by an operator in place of the electrically driven rollers 42. The testing processes of the PC 46 in the manufacturing line are performed according to the following procedure:

(1) Function Testing Process

The electrically driven rollers 42 are continuously operated to move the pallet 40 during manufacturing. When the pallet 40, on which the PC 46 is mounted, is brought to the position on the conveyor 41 where the function testing process is to be performed, the operator steps on the foot-switch 45 to actuate the stopper 44, and thereby stops the pallet 40. Then, the operator inserts into the PC 46 the floppy disk 31 in which a program for performing the function testing process is stored, and operates a power switch of the PC 46.

In synchronism with supplying the power to the PC 46, the test program is executed for the function testing process. On completion of the function testing process, the operator again operates the power switch to disconnect the power supply from the PC 46, and takes the floppy disk 31 out of the PC 46. In order to transport the PC 46 to the position where the following test is to be performed, the stopper 44 is released to move the pallet 40.

(2) Continuous Operation Testing Process

When the pallet 40, on which the PC 46 is mounted, is brought to the position on the conveyor 41 where an operation testing process is to be performed, the operator steps on the foot-switch 45 to actuate the stopper 44 and thereby stops the pallet 40. Then, the operator inserts into the PC 46 the floppy disk 31 in which a program for executing the operation testing process is stored, operates the power switch of the PC 46, and releases the stopper 44. While the test program is being executed in the PC, the pallet 40 is moving on the conveyor 41. After checking the test results at a remote location, the operator again operates the power switch of the PC 46 and disconnects the power supply.

In order to prevent the HDD from being damaged while the PC 46 is transported between these testing processes, as shown by the mark ① in FIG. 3, the motor of the HDD is stopped when the PC 46 reaches the area for the function testing process, where the HDD is not required to be used. Further, as shown by the mark ② in FIG. 3, the motor of the HDD is stopped immediately after the operation testing process for the HDD is completed in the continuous operation testing process.

Thus, by stopping the motor before initiating each of the function testing processes, the magnetic disk is prevented from being damaged by vibration or shock while the PC 46 is moved to the next testing process. Since the motor is stopped until the function testing process is over, the conventional wait time is not required after the power supply to the PC 46 is disconnected. Therefore, the PC 46 can be immediately moved to the next process.

Further, by stopping the motor on completion of the HDD operation testing process, the magnetic disk is prevented from being damaged by vibration caused during the continuous operation testing process, which is performed while the PC is being moved. For the command functioning to stop the HDD motor in the program for the testing processes, well known commands are utilized, such as "STANDBY immediate", "STANDBY", or, "STOP".

The function of the command "STANDBY immediate" stops rotation of the motor immediately after the command is received, and the function of the command "STANDBY", stops rotation of the motor unless any access command is issued to the HDD in a determined period of time after the command is received. When these instructions are given, the motor is stopped temporally and the HDD suspends operation, but, when the tests in the HDD or other tests are resumed, the motor automatically starts operating. Accordingly, these functions are very suitable to such a case as the continuous operation testing process when repeated accesses are required to the HDD, after completion of the HDD operation testing process.

In contrast, the function of the command "STOP", stops rotation of the motor and allows the power supply to be disconnected. Accordingly, the HDD is required to be restarted to drive the motor again.

The detailed procedure will be explained in the following with reference to FIGS. 8 to 11.

Figure 8:
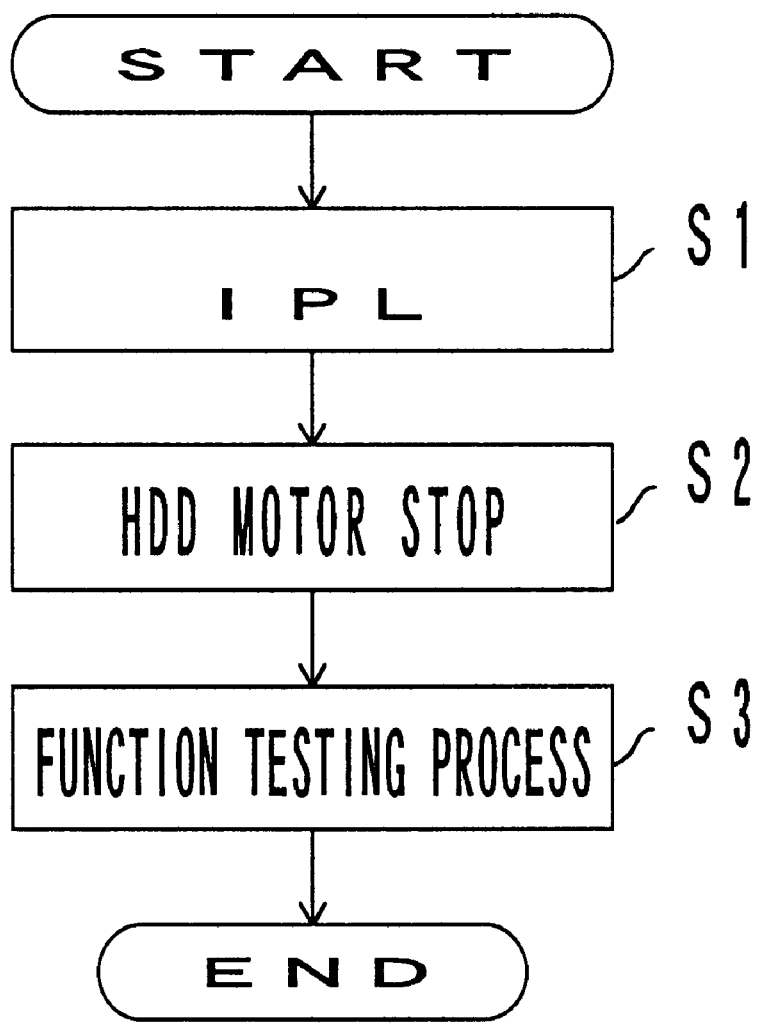
FIG. 8 is a flowchart showing a first testing procedure.

FIG. 8 shows a flowchart of the procedure to stop the motor when the function testing process starts. On starting the process by connecting the power supply, the program executes first the normal IPL process (step S1), and then unconditionally stops the motor of the HDD (step S2), followed by the performance of a predetermined function testing process (step S3). The process is completed by disconnecting the power supply.

Figure 9:
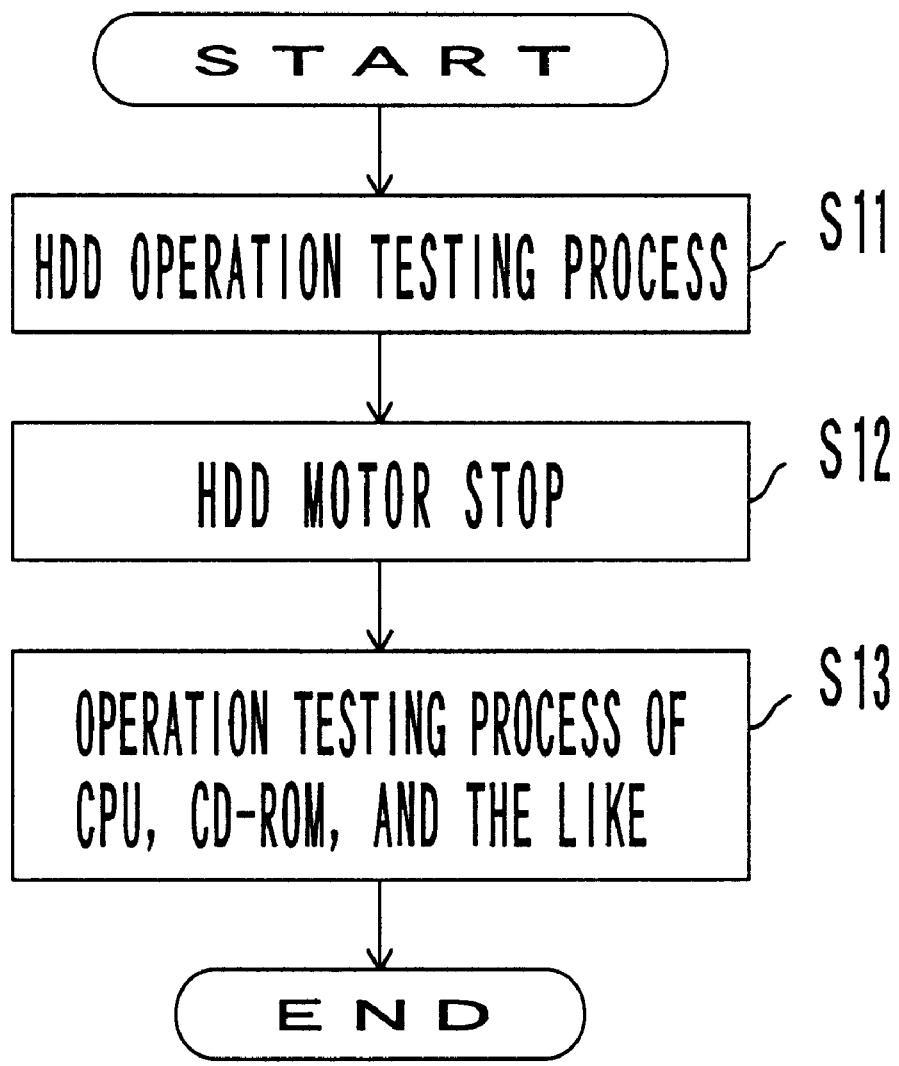
FIG. 9 is a flowchart showing a second testing procedure.

FIG. 9 is a flowchart of the procedure to stop the motor when the HDD operation testing process is finished. On starting the process by connecting the power supply, the program performs first the HDD operation testing process (step S11), and then stops the motor of the HDD (step S12), followed by the operation testing processes, such as the CPU operation testing process, the CD-ROM operation testing process and the like (step S13). The processes are completed by disconnecting the power supply.

When the continuous operation testing process including the HDD operation testing process, the CPU operation testing process, the CD-ROM operation testing process and the like, is performed under such conditions that no vibration or the like occurs during the testing processes, the motor may be stopped on completion of a series of the testing processes.

Figure 10:
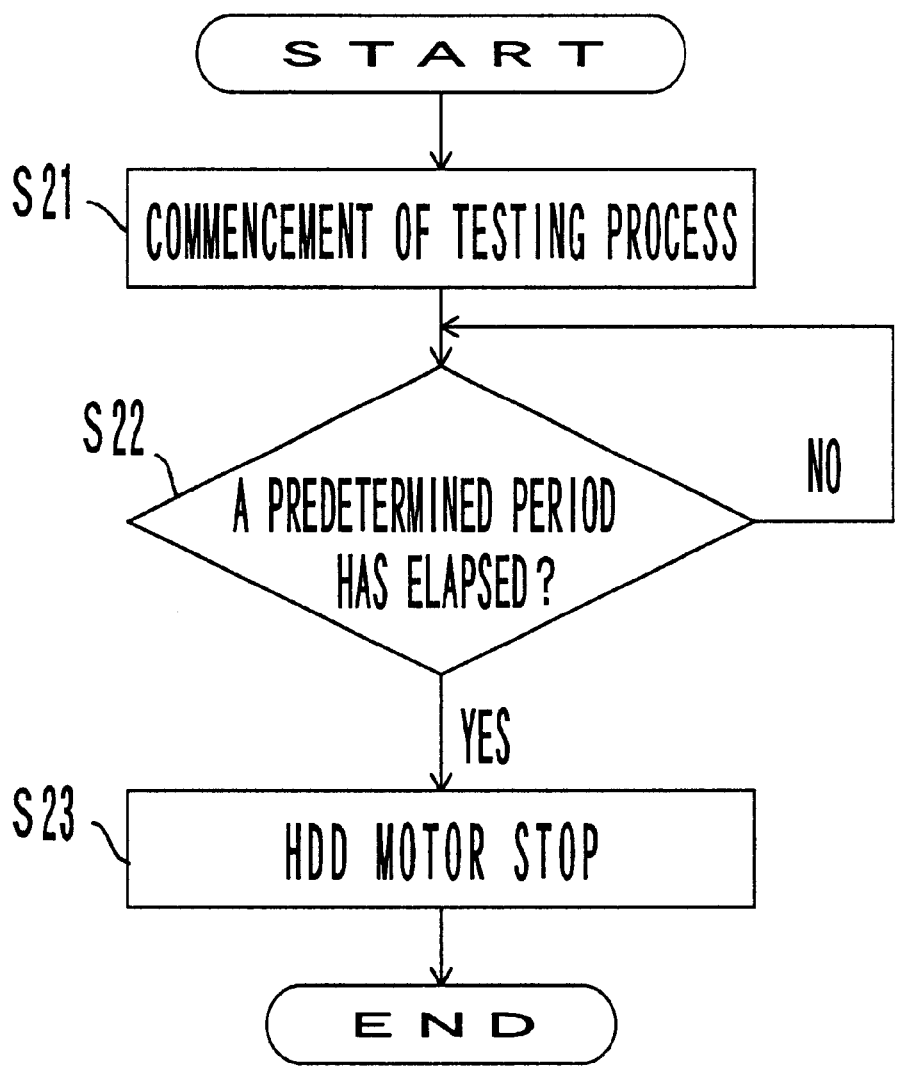
FIG. 10 is a flowchart showing a third testing procedure.

The motor can be stopped after a predetermined period of time after commencement of the testing process. FIG. 10 shows a flowchart of this procedure. On starting the testing process by connecting the power supply, the program first executes the testing process in terms of the HDD (step S21), and periodically determines by means of a timer whether or not a predetermined period of time has elapsed (step S22). Then, after a predetermined period of time, the motor of the HDD is stopped (step S23). On completion of all the following testing processes, if such testing processes are performed, the power supply is disconnected to terminate the process.

Through this testing process, the motor can be stopped at any time after commencement of the testing process, and the magnetic disk can be prevented from being damaged due to a vibration or other shock after the motor stops.

Figure 11:
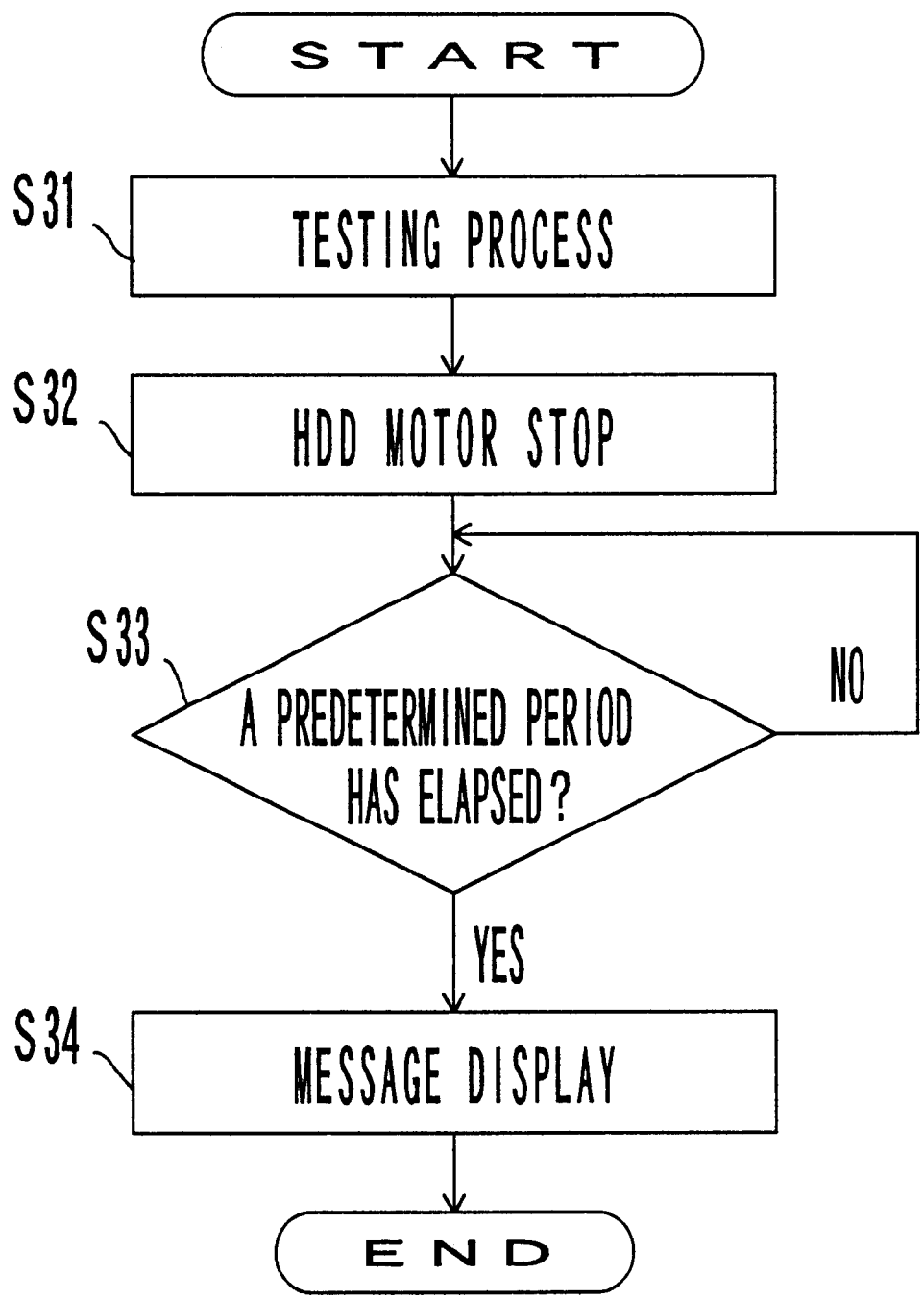
FIG. 11 is a flowchart showing a fourth testing procedure.

Moreover, when the testing process using the HDD is performed in the final stage, the power supply may be disconnected after the motor is stopped and a predetermined wait time has elapsed. FIG. 11 shows a flowchart of this procedure.

When the testing process is started by connecting the power supply, the program first executes the testing process using the HDD (step S31), and after the motor of the HDD is stopped (step S32), determines by means of a timer whether or not a predetermined period of time has elapsed (step S33). Then, a message representing that the power supply may be disconnected is displayed on a display 29 after the predetermined period of time (step S34). On receipt of the message, the operator disconnects the power supply to terminate the testing process.

Through this testing process, the PC can be set into a state, in which the power supply may be disconnected, at any time after the motor is stopped, and the power supply can be disconnected when the operator confirms that the motor is stopped. As a result, the magnetic disk can be prevented from being damaged due to vibration or the like after the motor stops. Further, by setting a suitable value to the timer, the operator can be directed to disconnect the power supply after completion of a series of other testing processes.

The preferred embodiment described above relates to the testing process of the PC with the HDD installed. Similarly, the present invention can be applied to the testing process of the information processing device comprising various kinds of disk units with non-contacting heads, such as an optical disk unit, a magneto-optical disk unit, and the like.

According to the present invention, the storage data can be prevented from being damaged due to contacting of a disk with a head, because the head is automatically set outside side of the data storage area.

What is claimed is:

1. A testing apparatus for testing an information processing device having a disk unit at a plurality of testing positions, comprising:
    a testing device performing an operation testing process of said information processing device, and
    a processing device executing a program for the operation testing process to set a head of said disk unit to a specific safe position, where data damage is prevented during transportation of the disk unit, automatically according to a programmed timing at a current testing position when said disk unit is to be transported from the current testing position to a next testing position.

2. A testing apparatus for testing an information processing device, comprising:
    a disk unit tested at a plurality of testing positions;
    a processing device executing a program to perform an operation testing process of said information processing device and stop said disk unit automatically according to a programmed timing at a current testing position when said disk unit is to be transported from the current testing position to a next testing position, and
    a setting device setting a head of said disk unit to a specific safe position, where data damage is prevented during transportation of said disk unit, when said disk unit is stopped.

3. The testing apparatus as set forth in claim 2, wherein said processing device executes said program to stop a motor of said disk unit.

4. A computer-readable recording medium which stores a program used to direct an information processing device having a disk unit tested at a plurality of testing positions to perform:
    performing an operation testing process of said information processing device, and
    setting a head of said disk unit to a specific safe position, where data damage is prevented during transportation of the disk unit, automatically according to a programmed timing at a current testing position when said disk unit is to be transported from the current testing position to a next testing position.

5. The recording medium as set forth in claim 4, wherein said information processing device is directed to perform a step of stopping a motor of said disk unit for setting said head to said specific position, when said disk unit is out of use.

6. The recording medium as set forth in claim 5, wherein said information processing device is directed to perform a step of stopping said motor after an initial program loading in said information processing device.

7. The recording medium as set forth in claim 5, wherein said information processing device is directed to perform a step of stopping said motor after a testing process using said disk unit is completed.

8. The recording medium as set forth in claim 5, wherein said information processing device is directed to perform a step of stopping said motor after series of testing processes are completed.

9. The recording medium as set forth in claim 5, wherein said information processing device is directed to perform a step of stopping said motor after a predetermined period of time has elapsed after commencement of the testing process.

10. The recording medium as set forth in claim 5, wherein said information processing device is directed to perform a step of allowing a power supply to be disconnected after a predetermined period of time has elapsed after said motor is stopped.

11. The recording medium as set forth in claim 5, wherein said information processing device is directed to perform a step of stopping said motor by one of STANDBY imnmediate, STANDBY, and STOP functions.

12. A testing method for testing an information processing device having a disk unit at a plurality of testing positions, comprising:
    executing a program for an operation testing process of said information processing device, and
    setting a head of said disk unit to a specific safe position, where data damage is prevented during transportation of the disk unit, automatically according to a programmed timing at a current testing position according to an instruction of the program when said disk unit is out of use.

13. The testing method as set forth in claim 12, wherein a motor of said disk unit is stopped to set said head to said specific position when said disk unit is out of use.

14. The testing method as set forth in claim 13, wherein said motor is stopped after an initial program loading in said information processing device.

15. The testing method as set forth in claim 13, wherein said motor is stopped after a testing process using said disk unit is completed.

16. The testing method as set forth in claim 13, wherein said motor is stopped after completion of a series of testing processes.

17. The testing method as set forth in claim 13, wherein said motor is stopped after a predetermined period of time has elapsed after commencement of the testing process.

18. The testing method as set forth in claim 13, wherein a power supply of said information processing device is allowed to be disconnected after a predetermined period of time has elapsed after said motor is stopped.

19. The testing method as set forth in claim 13, wherein said motor is stopped by one of STANDBY immediate, STANDBY, and STOP functions.

20. A testing method for testing an information processing device having a disk unit, comprising:
    executing a program for an operation testing process of said information processing device, and
    setting a head of said disk unit, tested at a plurality of testing positions, to a specific safe position, where data damage is prevented during transportation of the disk unit, automatically according to a programmed timing at a current testing position according to an instruction of the program when said disk unit is to be transported from a current position to a next position.

21. A testing apparatus testing an information processing device, comprising:

a testing device testing said information processing device, and a processor executing a program controlling said testing device to set a head of a disk unit, at a plurality of testing positions, to a specific safe position, where data damage is prevented during transportation of the disk unit, automatically according to a programmed timing at a current testing position when the disk unit is not in use.

22. A method of testing an information processing device comprising:

performing an operation testing process on the information processing device, and executing a program for the operation testing process to set a head of a disk unit, tested at a plurality of testing positions, to a specific safe position, where data damage is prevented during transportation of the disk unit, automatically according to a programmed timing at a current testing position when the disk unit is not in use.

* * * * *

UNITED STATES PATENT AND TRADEMARK OFFICE
CERTIFICATE OF CORRECTION

PATENT NO. : 6,332,203 B1
DATED : December 18, 2001
INVENTOR(S) : Hitoshi Tanaka et al.

It is certified that error appears in the above-identified patent and that said Letters Patent is hereby corrected as shown below:

<u>Column 8,</u>
Line 23, delete "imnmediate" and replace it with -- immediate --.

Signed and Sealed this

Nineteenth Day of March, 2002

Attest:

JAMES E. ROGAN
*Attesting Officer*     *Director of the United States Patent and Trademark Office*